March 28, 1950     W. J. BRUSKE     2,502,035
STEEL JAW GAME TRAP
Filed Aug. 20, 1947
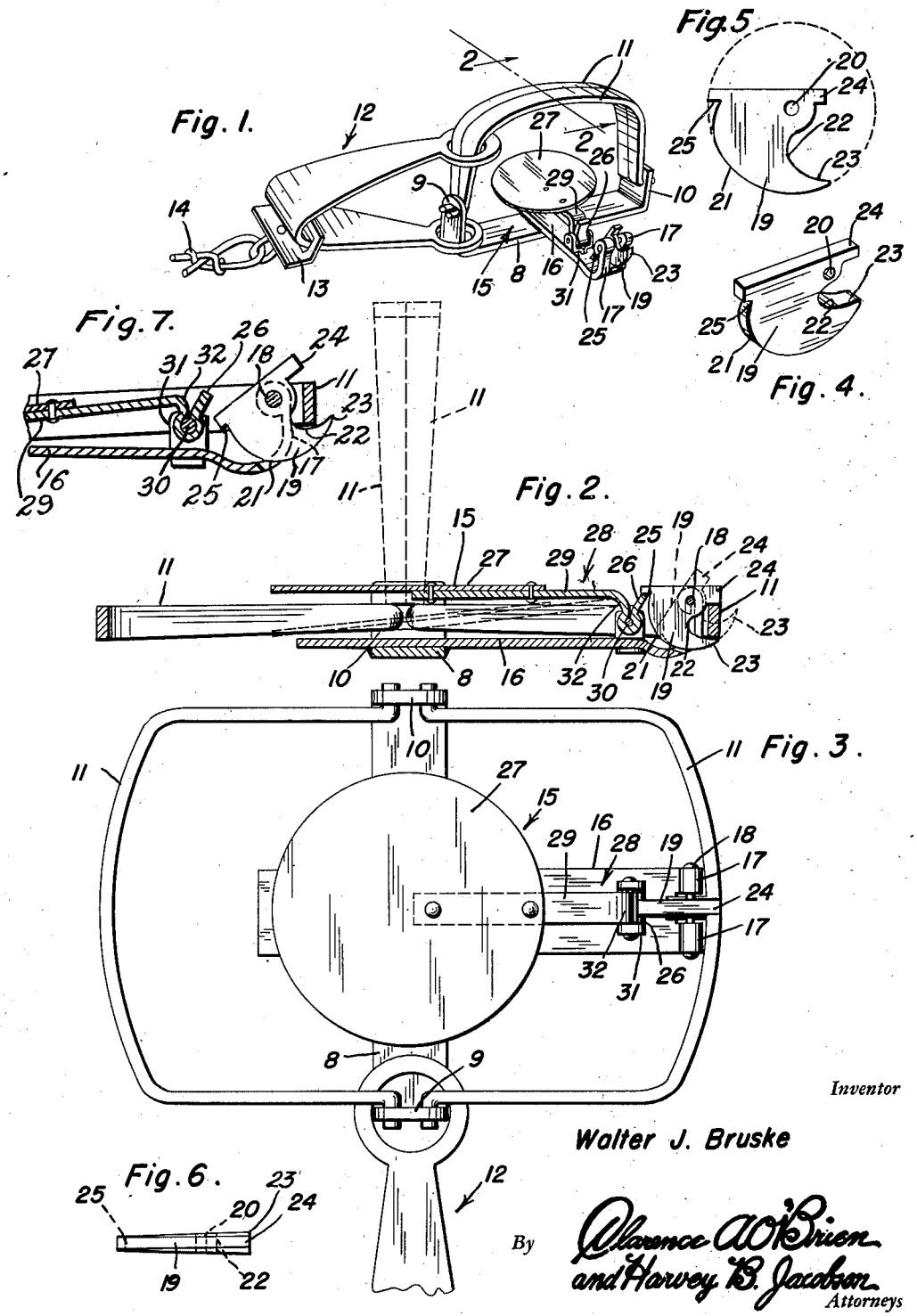
Inventor
Walter J. Bruske Patented Mar. 28, 1950

2,502,035

UNITED STATES PATENT OFFICE 2,502,035

STEEL JAW GAME TRAP

Walter J. Bruske, Fall Creek, Wis.

Application August 20, 1947, Serial No. 769,730

6 Claims. (Cl. 43—92)

The present invention relates to that classification of inventions including so-called steel jaw game traps and has more particular reference to certain new and useful improvements which combine and contribute to the production of what is believed to be a trap of outstanding efficiency and superiority in which users will find their needs fully met, contained, and conveniently available.

As implied in the opening statement of the invention, I am conversant with the art of trapping and with most traps in this category presently on the market and in use and have knowledge of patented traps in this field, some in use and others not. In order to provide a background in relation to which the improvements of the instant invention may be best visualized, I make reference to Oneida Victor traps, for example, one type of which is covered in U. S. Patent 1,540,691. This has to do with a base bar having upstanding ends carrying a pair of openable and closable companion jaws, suitable spring means for closing the jaws, a pan and a so-called cross bar on which the pan is mounted, the outer end of said bar carrying a pivoted latch or dog which bridges one of the jaws when open and is associable at its inner end with trigger means which is pan-released.

The common dog or latch, used on most traps (for instance 1,540,691) for more than a hundred years, usually reaches for a considerable distance within the limits of the jaw space or range when the trap is in set position and flips upwardy and outwardly when the trap is sprung. It happens at times that an animal's foot is resting partly on the latch and is thus thrown completely clear of the up closing jaws or, at best, it results only in "toe-nail" catches. Also, in order to capture sly animals like the fox, etc., experienced trappers find it necessary to conceal traps under natural materials, such as earth, sand, leaves, and the like, and to prevent such materials from getting under the pan and clogging same, a piece of paper, cloth, or the like, is first placed over the pan within the jaws, and great pains must be taken to provide a slit or opening for the latch or dog to come upward and clear therethrough. Any obstruction will result in misfire and trap failure.

The present invention has for an object to overcome the faults, defects and inconveniences described in the foregoing by the employment of a new and original dog or latch which performs in direct reverse to the old style dog. It does not flip upwardly and outwardly but, on the contrary, it moves downwardly and inwardly when the trap is sprung, thereby positively preventing throwouts, and when concealing the traps, no precautions need be observed as far as this new style dog is concerned.

Another object of the invention is to provide an ingenious latch or dog of a pivoted gravity type which, due to its peculiar shape and location and relation to one of the jaws, provides a semi-automatic, easy-to-set feature, this due to the fact that when the trap is at rest at the proper level, the center of the mass of the dog relative to its pivotal plane will cause it to be suspended partly beneath one jaw when down and open and so that when the trap spring is compressed and the jaw is brought down, said jaw will engage the beak or toe of the dog and force it down also, thereby raising the keeper notch in a manner that it may be easily engaged with the trigger by simply tilting the pan.

Another object of the invention is the elimination of the usual outer end extension of the cross bar or bracket, my improved bracket being shorter and terminating within the confines of the coacting jaw, thus making it possible to make sets in smaller runways.

Since it is important that the pan be level when the trap is in set position, it is another object of the invention to mount the pan on an improved trigger construction, the latter being such as to permit pan level adjustments to be made with the aid of pliers or the like by bending the pan shank, trigger or dog post, the construction of such parts being highly simple and practical and insuring compactness and convenience.

Other objects and advantages of the invention will become more readily apparent from the following description and the accompanying illustrative drawing.

In the drawing, wherein like numerals are employed to designated like parts throughout the views:

Figure 1 is a perspective view of a steel jaw game trap constructed in accordance with the principles and improvements of the instant invention.

Figure 2 is an enlarged sectional view, partly in elevation, the section being on the line 2—2 of Figure 1, looking in the direction of the arrows and the jaws being shown open and the trap set for use;

Figure 3 is a top plan view of the structure seen in Figure 2;

Figure 4 is a perspective view of the novel and improved latch or dog;

Figure 5 is a side elevational view of the same;

Figure 6 is a top plan view of the same; and

Figure 7 is a fragmentary view which will serve to illustrate the semi-automatic easy-to-set feature of the latch and trigger combination.

Briefly summarized, and by way of introduction to the detailed description, it will be seen that the essential aspect of this invention has to do with a bracket, latch dog, trigger and pan assemblage which lends itself for attachment to the base bar of any modern steel jaw trap, and characterized by an L-shaped bracket embodying a long limb and a short limb, the latter limb and the adjacent end portion of the long limb being bifurcated and providing furcations and a clearance notch between said furcations, said notch being open at one end. A hinge pin is mounted in the free end portions of the furcations and bridges the open end of the notch. A substantially quadrantal latch dog is concentrically pivoted on the stated pin and swings back and forth in a prescribed 90° arcuate path through said notch, said latch dog being weighted and adapted to drop, under forces of gravity, from its jaw-setting and retaining to its free-to-reset position. Finally, trigger means is mounted for operation on the long limb and is releasably cooperable with the latch dog when the latter is in its set position and the pan is mounted on and carried by the trigger means.

Reference being had to Figures 1 to 3, the horizontal base bar is denoted by the numeral 8 and has upturned ends 9 and 10 to accommodate the hingedly attached ends of the trapping jaws 11. A common type of V-spring is denoted at 12 and is operatively connected with the associable parts, as seen in Figure 1, and this is provided with an attaching clip 13 and staking chain 14. Parts 8 to 14 are old and well known. My invention relates to the pan, trigger and latch-dog assembly unitarily denoted by the numeral 15. This assembly comprises a substantially L-shaped cross bar 16 at right angles to the bar 8 and attached thereto and projecting, at a right angle, to the limited extent shown. The upturned, outer end portion is bifurcated and the furcations are provided with bearings 17 for a dog hinging pin 18. The notch provided between said furcations constitutes an accommodation or adapter for the novel latch dog 19. Said dog, as shown in the drawing, is generally sector-shaped but may perhaps best be defined as quadrantal. The main body portion has a suitably located hinge pin hole 20 for the concentric hinge pin 18. The curvate edge 21 is, in effect, a cam. The attenuation is tapered and a portion is cut out, as at 22, to provide a piloting as well as resetting beak or toe 23. This thus weighted, broad toe or beak swings back and forth in a pendulous manner in the clearance notch between said furcations. When the weighted dog is disengaged it drops down, under the force of gravity, to the dotted line position shown in Figures 1 and 7. The upper end portion of the dog is provided with a detent 24, rectangular in cross section, which is releasably engageable with the coacting jaw 11, as shown in Figures 2 and 3. On the cam side, and adjacent the top, is a keeper notch 25 which serves to accommodate the pan-released trigger 26.

The pan, which is usual in construction, is denoted by the numeral 27 and the shank of the trigger means 28, that is, the shank 29, is riveted or otherwise securely fastened to the under side of said pan. The outer end portion of the shank is bent into an anchoring and pivoting eye 30 hingedly mounted on a trigger post 31. The junctural portion 32 is sufficiently malleable to permit bending for adjustment purposes. Therefore, the shank is bendable for pan levelling and so is the trigger 26.

It should be noted that the latch dog is wedge-shaped; that is, it is thicker at the beak and diminishes gradually in thickness from the beak 23 to the keeper or trigger notch 25. Thus, there are both weight and mass factors (relative to acceleration due to forces of gravity) to be taken into account. For example, it will be noticed that the center of the mass is in a plane between the hinge pin 18 and said keeper notch 25 when said dog is in set position (Figs. 2 and 3).

As before stated, novelty is thought to reside in the assembly 15 as an accessory attachable to a common type of jaw trap as well as in the individual parts which go to make up said assembly.

The improved assembly or unit means 15 is applicable to all styles of traps, whether long spring, under spring or coil spring, as well as whether single spring or double spring.

Reverting to the aforementioned semi-automatic easy-to-set feature, it will be seen that when the trap is sprung or closed and resting in a horizontal plane, the aforementioned factor of mass will cause the latch dog to be suspended about as depicted in Figs. 1 and 7, or it can be held thus with the trap at any angle, by placing a finger or mittened hand under it. When the trap spring is compressed and the right hand jaw is brought down, it will engage the beak 23 of the dog and force it down also, thereby raising the keeper notch 25 so that it can be caught on the trigger 26 by simply raising the pan. The trap is then in set position.

From the foregoing, it will be evident that novelty is thought to reside in the quadrant-like latch-dog 19 having a curvate edge 21 facilitating the setting step and having a finger-operable beak 23 contributing to this same phase of operation. The provision of the concentric pivot and the gravity drop feature also contribute to the easy-to-set accomplishment as well as the operation of the dog when disengaged from the trigger means. The simple bifurcated construction on the outer end of the bracket 16, which paves the way for expeditious release action of the dog, is important; and, as before stated, the bendable trigger construction 28 is worthy of studied consideration.

Then, too, it will be clear from the drawings that the latch dog swings in an orbital path which represents a 360° circle, that the curvate edge portion or so-called cam 21 is approximately representative of a 90° arc. All of said edge portion and clearance notch 25 must, therefore, being on a concentric pivot 20 in relation to the "circle," swing within the perimeter limits of said circle.

Touching again and finally on the tapered or wedge-shaped latch dog, I reiterate that the reason for this is that when the trap is sprung, the dog will instantly loosen from the side wall friction of the earth covering so that there is no impediment to delay the trap jaws in closing and despite the fact that the beak is relatively broad, it encounters no resistance because it moves into the cavity vacated by the trap jaw as the latter closes. And I might add, too, that the broad beak literally plows its way through any mud or snow that may exist and opens up a channel which is wider than the trailing end portion of the dog, thus allowing the latter to enter the channel and swing through it without obstruction. What is more, the latch dog is unique in that it is characterized by three distinguishable marginal edge portions; one curvate edge 21 defining the aforementioned 90° arc, the straight edge portion, which may be said to be the top and which coacts at one end in defining the keeper notch 25, with the opposite end extending to provide the overhanging detent 24. Then, there is the third edge which is opposed to the curvate edge and this is the one which is recessed or cut back to define the overhanging detent and also to define the beak 23, which latter element underlies the detent so as to make possible the easy-to-set arrangement shown to advantage in Fig. 7.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. A bracket, latch dog, trigger and pan assemblage for attachment to the base bar of a steel jaw trap of the type shown and described comprising an L-shaped bracket embodying a long limb and a short limb, the latter limb and the adjacent end portion of said long limb being bifurcated and providing furcations and defining a clearance notch between said furcations, said notch being open at one end, a hinge pin mounted in the free end portion of said furcations and bridging the open end of said notch, a substantially quadrantal latch-dog concentrically pivoted on said pin and swingable back and forth in a prescribed arcuate path through said notch, said latch dog being weighted and adapted to automatically drop, under the forces of gravity, from its jaw setting and retaining its free-to-reset position, trigger means mounted for operation on said long limb and releasably cooperable with said latch dog when the latter is in its set position, and a pan mounted on and carried by said trigger means.

2. A bracket, latch dog, trigger and pan assemblage for attachment to the base bar of a steel jaw trap of the type shown and described comprising an L-shaped bracket embodying a long limb and a short limb, the latter limb and the adjacent end portion of said long limb being bifurcated and providing furcations and defining a clearance notch between said furcations, said notch being open at one end, a hinge pin mounted in the free end portion of said furcations and bridging the open end of said notch, a substantially quadrantal latch-dog concentrically pivoted on said pin and swingable back and forth in a prescribed arcuate path through said notch, said latch dog being weighted and adapted to automatically drop under the forces of gravity from its jaw setting and retaining to its free-to-reset position, said dog having a curvate marginal edge portion defining a 90 degree arc and thus adapted to swing within the circumscribing limits of a predetermined circular path, trigger means mounted for operation on said long limb and releasably cooperable with said latch dog when the latter is in its set position, and a pan mounted on and carried by said trigger means.

3. A bracket, latch dog, trigger and pan assemblage for attachment to the base bar of a steel jaw trap of the type shown and described comprising an L-shaped bracket embodying a long limb and a short limb, the latter limb and the adjacent end portion of said long limb being bifurcated and providing furcations and defining a clearance notch between said furcations, said notch being open at one end, a hinge pin mounted in the free end portion of said furcations and bridging the open end of said notch, a substantially quadrantal latch-dog concentrically pivoted on said pin and swingable back and forth in a prescribed arcuate path through said notch, said latch-dog being weighted and adapted to automatically drop under the forces of gravity from its jaw setting and retaining to its free-to-reset position, said dog having a curvate marginal edge portion defining a 90 degree arc and thus adapted to swing within the circumscribing limits of a predetermined circular path, having a second marginal edge portion cut away and defining a re-set beak, and having a third marginal edge portion which is flat, linearly straight from end to end, one end of said edge portion projecting beyond the second named edge portion and providing a jaw detent, the latter adapted to overhang the stated jaw, and said beak being designed and located to underlie said jaw, trigger means mounted for operation on said long limb and releasably cooperable with said latch dog when latter is in its set position, and a pan mounted on and carried by said trigger means.

4. The structure of claim 3 wherein said latch-dog is wedge-shaped in cross-section and tapers from said keeper notch to said beak.

5. A jaw trap of the class shown and described comprising a base bar, spring closed jaw means swingably mounted on said base bar, an L-shaped bracket embodying long and short limbs, said long limb being attached to and extending at right angles from said base bar, said short limb having a clearance notch and provided with a horizontal hinge pin bridging said notch, said hinge pin being inwardly of and on a plane above the upper edge of the stated jaw when latter is in a set position, a substantially quadrantal latch-dog concentrically pivoted on said hinge pin and swingable back and forth through said notch in a prescribed arcuate path, one marginal edge portion of the latch-dog being part-circular and having a keeper notch, an opposed marginal edge of said latch-dog being cut-away to provide a clearance recess and defining a detent and an underlying beak, said jaw adapted to be positioned in said recess, said detent overlying the upper edge of the jaw and said beak underlying the lower edge of the jaw in set position, said latch dog being tapered and the center of its mass being in a plane between the hinge pin and said keeper notch when said dog is in a set position, and a pan having trigger means pivotally mounted on said long limb and including a trigger element releasably engageable with said keeper notch.

6. A bracket, latch dog, trigger and pan assemblage for attachment to the base bar of a steel jaw trap of the type shown and described comprising an L-shaped bracket embodying a long limb and a short limb, the latter limb and the adjacent end portion of said long limb being bifurcated and providing furcations and defining a clearance notch between said furcations, said notch being open at one end, a hinge pin mounted in the free end portions of said furcations and bridging the open end of said notch, a substantially quadrantal latch dog concentrically pivoted on said pin and swingable back and forth in a prescribed arcuate path through said notch, said latch dog being weighted and adapted to drop under the forces of gravity from its jaw setting and retaining to its free-to-reset position, said dog having a curvate marginal edge portion defining a 90° arc and thus adapted to swing within the circumscribing limits of a predetermined circular path, having a second marginal edge portion cut away and defining a reset beak, and having a third marginal edge portion which is flat, linearly straight from end to end, one end of said edge portion projecting beyond the second-named edge portion and providing a jaw detent, the latter adapted to overhang the stated jaw, and said beak being designed and located to underlie said jaw, a relatively short trigger post mounted on said long limb inwardly of and substantially parallel to the short limb and provided with a horizontal pivot on a plane well below the plane of the aforementioned pin, a pan, and a trigger having a shank attached rigidly at one end to said pan, the opposite end of said shank being laterally bent upon itself into an attaching and hinging eye, said eye being hingedly mounted on the pivot carried by said trigger post, the terminal end of said shank constituting a trigger and being coactable with the curvate marginal edge of said latch dog, the latter being provided, on said marginal edge, with a keeper notch for said trigger.

WALTER J. BRUSKE.

REFERENCES CITED

The following references are of record in the file of this patent:

UNITED STATES PATENTS

| Number | Name | Date |
|---|---|---|
| 312,094 | Cook et al. | Feb. 10, 1885 |
| 324,925 | Dennis | Aug. 25, 1885 |
| 354,599 | Dennis | Dec. 21, 1886 |
| 822,835 | Ewen | June 5, 1906 |
| 1,148,243 | McDermott | July 27, 1915 |
| 1,540,691 | Gibbs | June 2, 1925 |